United States Patent
Cheng et al.

(10) Patent No.: US 10,651,760 B1
(45) Date of Patent: May 12, 2020

(54) REDUCED SEMICONDUCTOR DEVICE POWER CELL VOLTAGE DRIVE

(71) Applicant: Rockwell Automation Technologies, Inc., Mayfield Heights, OH (US)

(72) Inventors: Zhong Y. Cheng, Cambridge (CA); Navid R. Zargari, Cambridge (CA); Ye Zhang, Cambridge (CA)

(73) Assignee: Rockwell Automation Technologies, Inc, Mayfield Heights, OH (US)

(*) Notice: Subject to any disclaimer, the term of this patent is extended or adjusted under 35 U.S.C. 154(b) by 0 days.

(21) Appl. No.: 16/393,613

(22) Filed: Apr. 24, 2019

(51) Int. Cl.
*H02M 5/45* (2006.01)
*H02M 5/458* (2006.01)
*H01F 30/14* (2006.01)

(52) U.S. Cl.
CPC .......... *H02M 5/4585* (2013.01); *H01F 30/14* (2013.01); *H02M 5/45* (2013.01); *H02M 5/4505* (2013.01)

(58) Field of Classification Search
CPC .. H02M 2003/1552; H02M 1/12; H02M 1/42; H02M 1/4225; H02M 1/4233; H02M 1/4241; H02M 1/4258; H02M 1/425; H02M 1/4208; H02M 2001/4283; H02M 2001/4291; H02M 5/40; H02M 5/42; H02M 5/44; H02M 5/443; H02M 5/45; H02M 5/4505; H02M 5/451; H02M 5/452; H02M 5/458; H02M 5/4585; G05F 1/70; H02J 3/01
See application file for complete search history.

(56) References Cited

U.S. PATENT DOCUMENTS

| | | | | |
|---|---|---|---|---|
| 2013/0093376 | A1* | 4/2013 | Yoo | H02M 1/126 318/503 |
| 2015/0236603 | A1* | 8/2015 | Jimichi | H02M 5/293 363/37 |
| 2017/0110977 | A1* | 4/2017 | Mihalache | H02M 5/4585 |

OTHER PUBLICATIONS

PM Lacasse, "A hierarchical, fuzzy inference approach to data" Itration and feature prioritization in the connected manufacturing enterprise, Journal of Big Data, 2018, pp. 1-31.

\* cited by examiner

*Primary Examiner* — Bryan R Perez
(74) *Attorney, Agent, or Firm* — Kunzler Bean & Adamson

(57) ABSTRACT

For a power supply with a reduced number of semiconductor devices, a phase shifting transformer receives a three-phase primary voltage and steps the three-phase primary voltage one of up and down to a secondary voltage with a plurality of secondary winding sets. There is phase shifting between different secondary winding sets. A plurality of power cell sets each comprise a plurality of power cells cascaded connected, and each power cell receives one of a single phase and a three-phase voltage of a distinct secondary winding set of the phase shifting transformer. Each power cell comprises no more than eight power semiconductor devices organized as a rectifier and an inverter. Each power semiconductor device is one of a diode and an active switch. Each power cell set generates one phase of a three-phase alternating current output.

20 Claims, 21 Drawing Sheets

REDUCED SEMICONDUCTOR DEVICE POWER CELL VOLTAGE DRIVE

BACKGROUND INFORMATION

The subject matter disclosed herein relates to power supplies based on power cells with reduced numbers of semiconductor devices.

BRIEF DESCRIPTION

A power supply based on cascaded power cells with a reduced number of semiconductor devices is disclosed. The power supply includes a phase shifting transformer and a plurality of power cell sets. The phase shifting transformer receives a three-phase primary voltage and steps the three-phase primary voltage one of up and down to a secondary voltage with a plurality of secondary winding sets. There is phase shifting between different secondary winding sets. The plurality of power cell sets each comprise a plurality of power cells cascaded connected, and each power cell receives one of a single phase and a three-phase voltage of a distinct secondary winding set of the phase shifting transformer. Each power cell comprises no more than eight power semiconductor devices organized as a rectifier and an inverter. Each power semiconductor device is one of a diode and an active switch. Each IGBT comprises an anti-parallel diode, and each power cell set generates one phase of a three-phase alternating current (AC) output.

An apparatus based on power cells with a reduced number of semiconductor devices for a power supply is also disclosed. The apparatus includes a plurality of power cells. The plurality of power cell sets each comprise a plurality of power cells cascaded connected, and each power cell receives one of a single phase and a three-phase voltage of a distinct secondary winding set of a phase shifting transformer. Each power cell comprises no more than eight power semiconductor devices organized as a rectifier and an inverter. Each power semiconductor device is one of a diode, an active switch. Each power cell set generates one phase of a three-phase AC output.

A method for a power supply based on power cells with a reduced number of semiconductor devices is also disclosed. The method provides a phase shifting transformer that receives a three-phase primary voltage and steps the three-phase primary voltage one of up and down to a secondary voltage with a plurality of secondary winding sets. There is phase shifting between different secondary winding sets. The method also provides plurality of power cell sets each comprise a plurality of power cells cascaded connected, and each power cell receives one of a single phase and a three-phase voltage of a distinct secondary winding set of a phase shifting transformer. Each power cell comprises no more than eight power semiconductor devices organized as a rectifier and an inverter. Each power semiconductor device is one of a diode and an active switch. Each power cell set generates one phase of a three-phase AC output.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure may refer to elements of proceeding figures. Like numbers refer to like elements in all figures, including alternate embodiments of like elements.

Figure 1A:
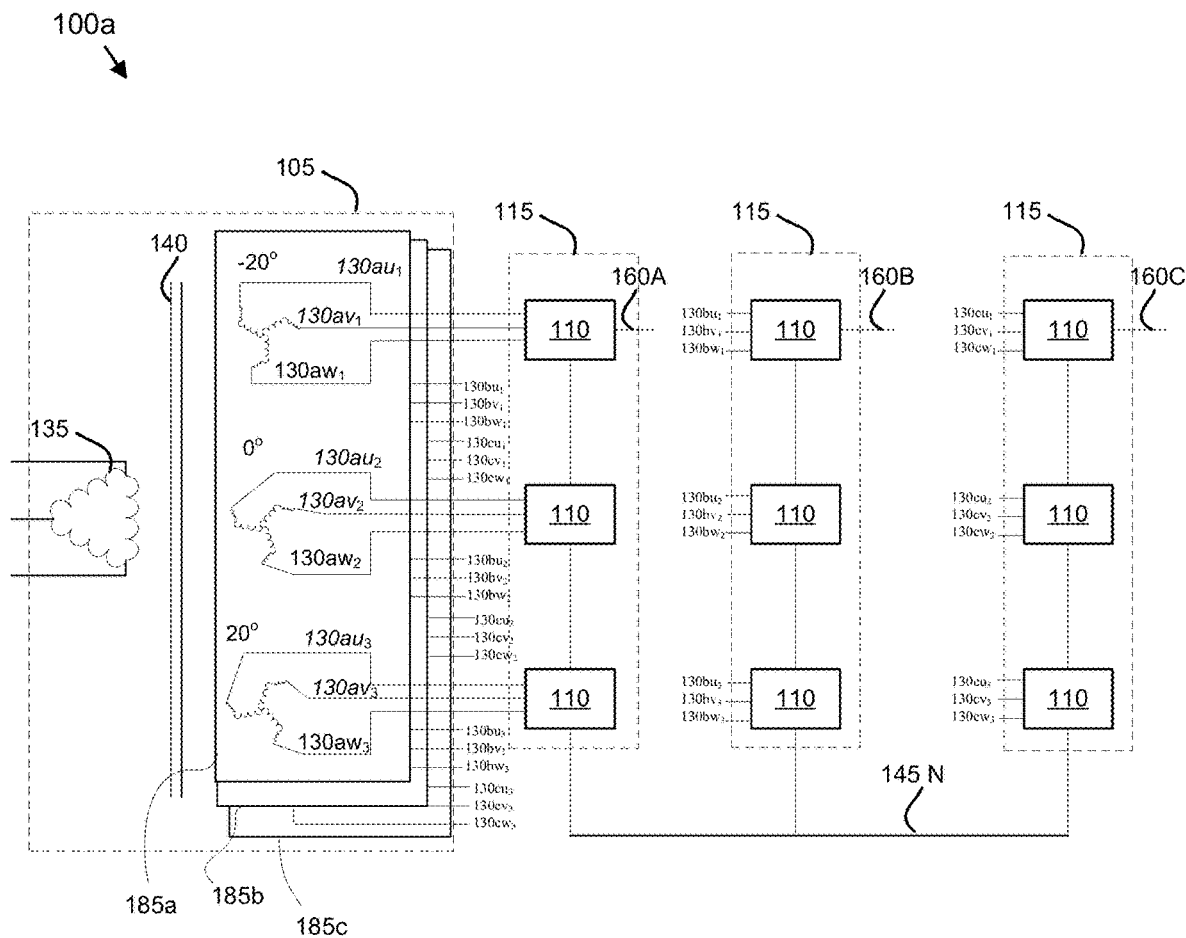
FIG. 1A is a schematic diagram of a power supply according to an embodiment.

FIG. 1A is a schematic diagram of a power supply 100a. The power supply 100a supplies a three-phase AC output with variable voltage and frequency to the load. The AC output may drive one or more motors as the load. The power supply 100a includes a phase shifting transformer 105 and a plurality of power cell sets 115.

In the depicted embodiment, the phase shifting transformer 105 includes primary winding 135, a core 140, and a plurality of secondary winding sets 130. The primary winding 135 of the phase shifting transformer 105 receives the three-phase primary voltage. The plurality of secondary winding sets 130 are magnetically coupled with the primary winding 135 and stepped the three-phase primary voltage up or down to a secondary voltage. In one embodiment, there is phase shifting between the different secondary winding sets 130. The transformer 105 is shown with Delta (4) connected primary winding 135 and zigzag connected secondary winding sets 130. It can also be Wye (Y) connected primary winding 135 and extended-Delta (4) secondary winding set 130, or polygon connected secondary winding set 130.

In the depicted embodiment, the phase shifting transformer 105 comprises 9 secondary winding sets 130 with 20 degree phase shifts among the voltage provided by the top three secondary winding sets 130a, the middle three secondary winding sets 130b, and the bottom three secondary winding sets 130c as indicated in FIG. 1A. each secondary winding set 130 provide the secondary voltage with the specified phase to the power cell sets 115.

In this embodiment, an exemplary 9 power cells circuit is shown. The number of power cells 110 may change depending on the requirement of the output voltage, thus the number of secondary winding sets 130 for each power cell set 115 will change accordingly. Generally speaking, the same circuit topology can be used for any number n of power cells 110 in series in each power cell set 115, and there will be the same amount of secondary winding sets 130 feeding each of the power cells 110. The phase shifting angles shown in FIG. 1A is also exemplary for n=3. These angles can be changed. In general, for n secondary winding sets 130 feeding n power cells 110 of each three-phase power cell set 115A-C, the phase shift angle within each set is 60°/n, or 20°/n. For example if n=4, the phase shift angle of the transformer secondary windings 130 for each power cell set 115 is 60°/4=15°, or 20°/4=5°. If n=5, the phase shift angle will be 60°/5=12°, or 20°/5=4°, and so on.

The plurality of power cell sets 115 each comprise a plurality of power cells 110 that are cascaded connected. Each power cell 110 receives one of a single phase and a three-phase voltage of a distinct secondary winding set 130 of the phase shifting transformer 105. Each power cell set 115 generates one phase 160A-C of a three-phase AC output.

The power cells 110 include a plurality of semiconductor devices to rectify and invert the voltage received from a secondary winding set 130 into a phase 160A-C of the three-phase AC output. As more semiconductor devices are used in the power cells 110, the cost and size of the power cells 110 and the power supply 100a are increased. The embodiments reduce the number of semiconductor devices in the power cells 110 and/or power supply 100 to reduce the cost and size of the power supply 100. In one embodiment, each power cell 110 comprises no more than eight power semiconductor devices. The power supply 100 is organized to provide the AC output with the reduced number of power semiconductor devices, resulting in significant cost savings.

Figure 1B:
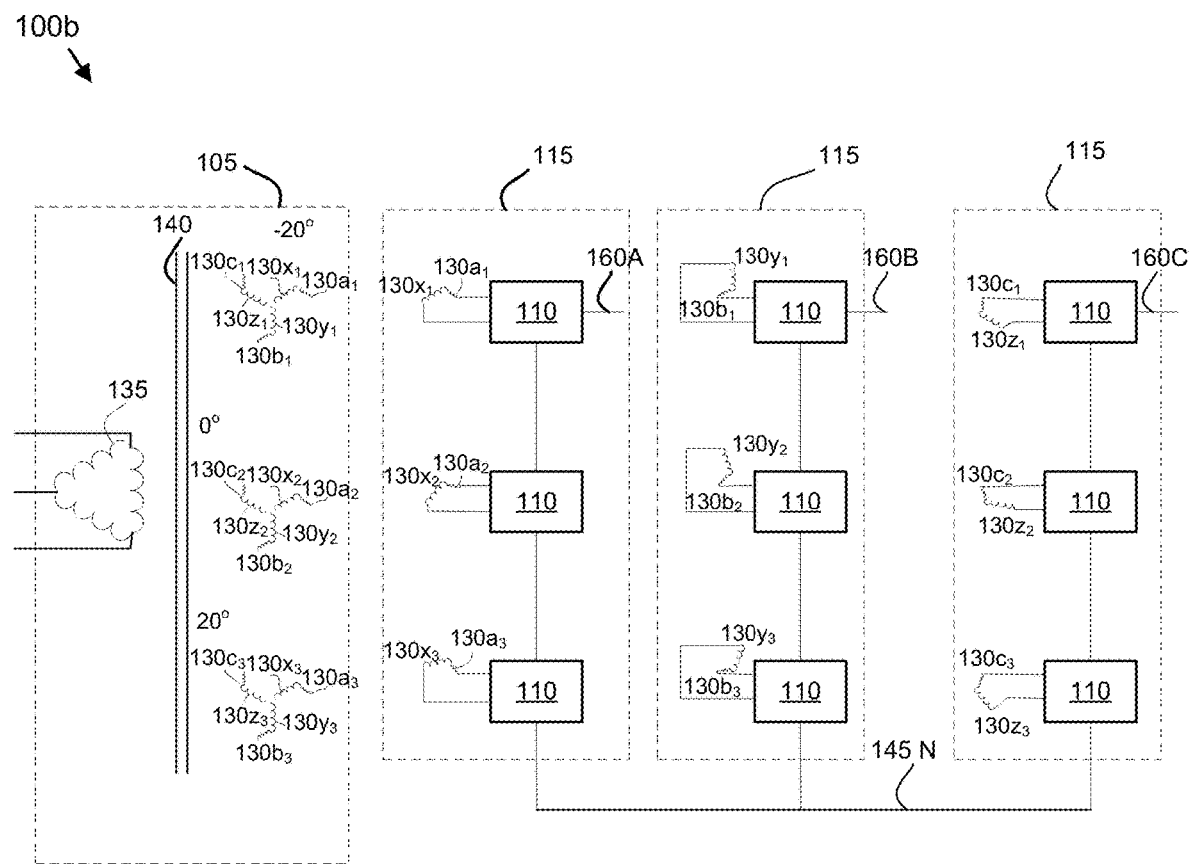
FIG. 1B is a schematic diagram of a power supply according to an alternate embodiment.

FIG. 1B is an exemplary schematic diagram of a power supply 100b. In the depicted embodiment, the phase shifting transformer 105 comprises 3 secondary winding sets 130 with 20 degree phase shifts among the voltage provided each secondary winding set 130. It differs from FIG. 1A in that the three phase secondary winding sets are terminated in such way that single phase power can be provided to the power cells, thus the number of three-phase secondary windings is ⅓ comparing to FIG. 1A.

In this embodiment, an exemplary 9 power cells circuit is shown. The number of power cells may change depending on the requirement of the output voltage, thus the number of secondary windings 130 for each power cell set 115 will change accordingly. Generally speaking, the same circuit topology can be used for any number n of power cells 110 in series in each power cell set 115, and there will be the same amount of secondary windings 130 feeding each of the power cells 110. The phase shifting angles shown in FIG. 1A is also exemplary for n=3. These angles may be changed. In general, for n secondary windings 130 feeding n power cells 110 of each three-phase power cell set 115A-C, the phase shift angle within each power cell set 115 is 60°/n. For example if n=4, the phase shift angle of the transformer secondary windings 130 for each power cell set 115 is 60°/4=15°. If n=5, the phase shift angle will be 60°/5=12°, and so on.

The topologies shown in FIG. 1A and FIG. 1B will be applied to the power cells depicted later. Exemplary n=3 power cells per set are used to demonstrate the circuit topology. In real implementation n can be any natural number.

Figure 1C:
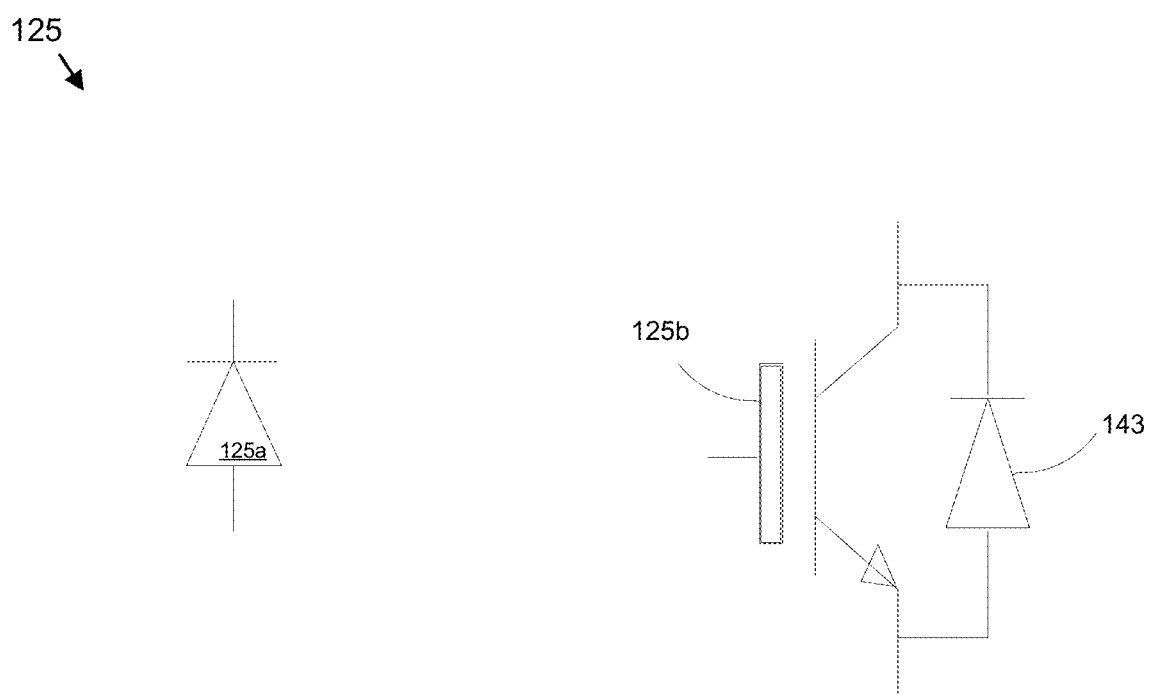
FIG. 1C is a schematic diagram of power semiconductor devices according to an embodiment.

FIG. 1C is a schematic diagram of power semiconductor devices 125. As used herein, a power semiconductor device 125 is one of a diode 125a and an active switch 125b. The diode 125a may also be a thyristor, or other active semiconductor switches. The active switch 125b may be an Insulated Gate Bipolar Transistor (IGBT) 125b. In one embodiment, the active switch 125*b* is field effect transistor (FET) 125*b*. The active switch 125*b* may be a metal-oxide semiconductor field-effect transistor (MOSFET) 125*b* or integrated gate commuted thyristor (IGCT). The active switch 125*b* may be other semiconductor switching devices such as silicon controlled rectifiers (SCR). The quantity of semiconductor switches are counted from circuit principle point of view. Semiconductor devices connected in parallel or series are count as single functional device. Each active switch 125*b* may comprise an anti-parallel diode 143. A power cell 110 may have no more than eight power semiconductor devices 125. In one embodiment, the no more than eight power semiconductor devices 125 are organized as a rectifier 150 and an inverter 155 within the power cell 110. The rectifier 150 may selectively modify the direction of an input current. The inverter 155 may form the required AC output. In one embodiment, a power cell 110 includes additional non-power semiconductor devices such as capacitors, connectors, connections, and the like. The numbers of non-power semiconductor devices may not be reduced.

Figure 2A:
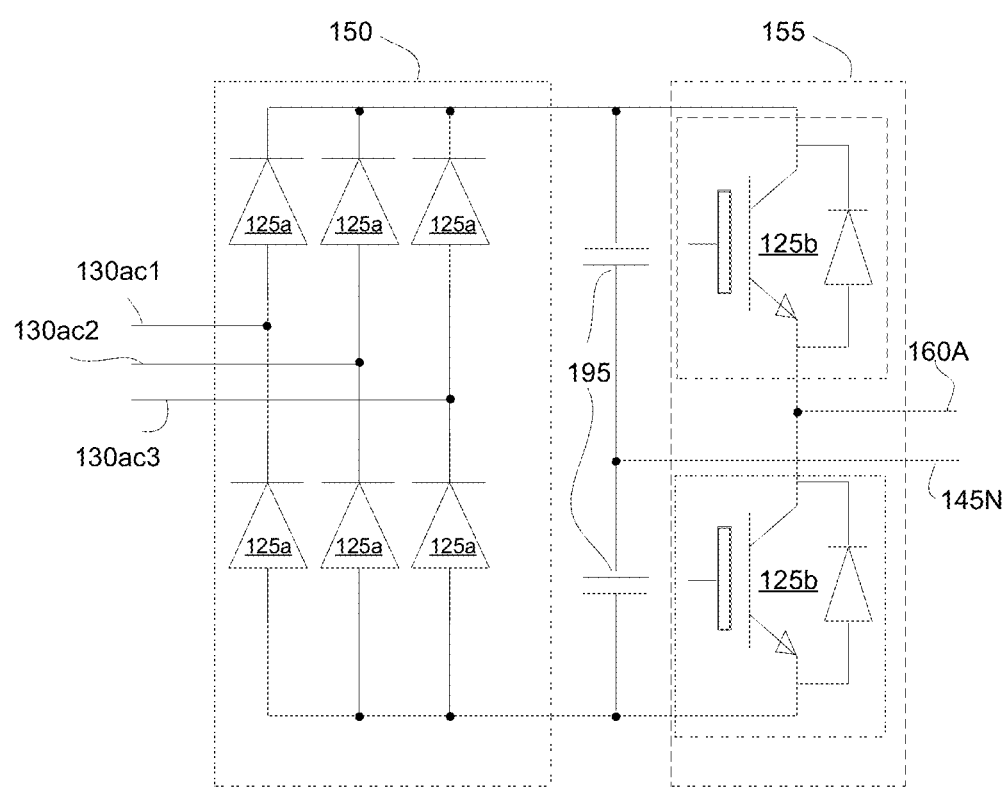
FIG. 2A is a schematic diagram of a power cell with a six-device rectifier and a two-device inverter according to an embodiment.

FIG. 2A is a schematic diagram of a power cell 110-1 with a six-power semiconductor device rectifier 150 and a two-power semiconductor device inverter 155. In the depicted embodiment, the power cell 110-1 comprises a rectifier 150 and an inverter 155. The rectifier 150 comprises six diodes 125*a*. The rectifier 150 is connected to one secondary winding set 130*ac*1-3. The inverter 155 comprises two IGBTs 125*b* that output a phase 160A-C of the three-phase AC output and a neutral 145N. Two non-power semiconductor device capacitors 195 are also shown.

Figure 2B:
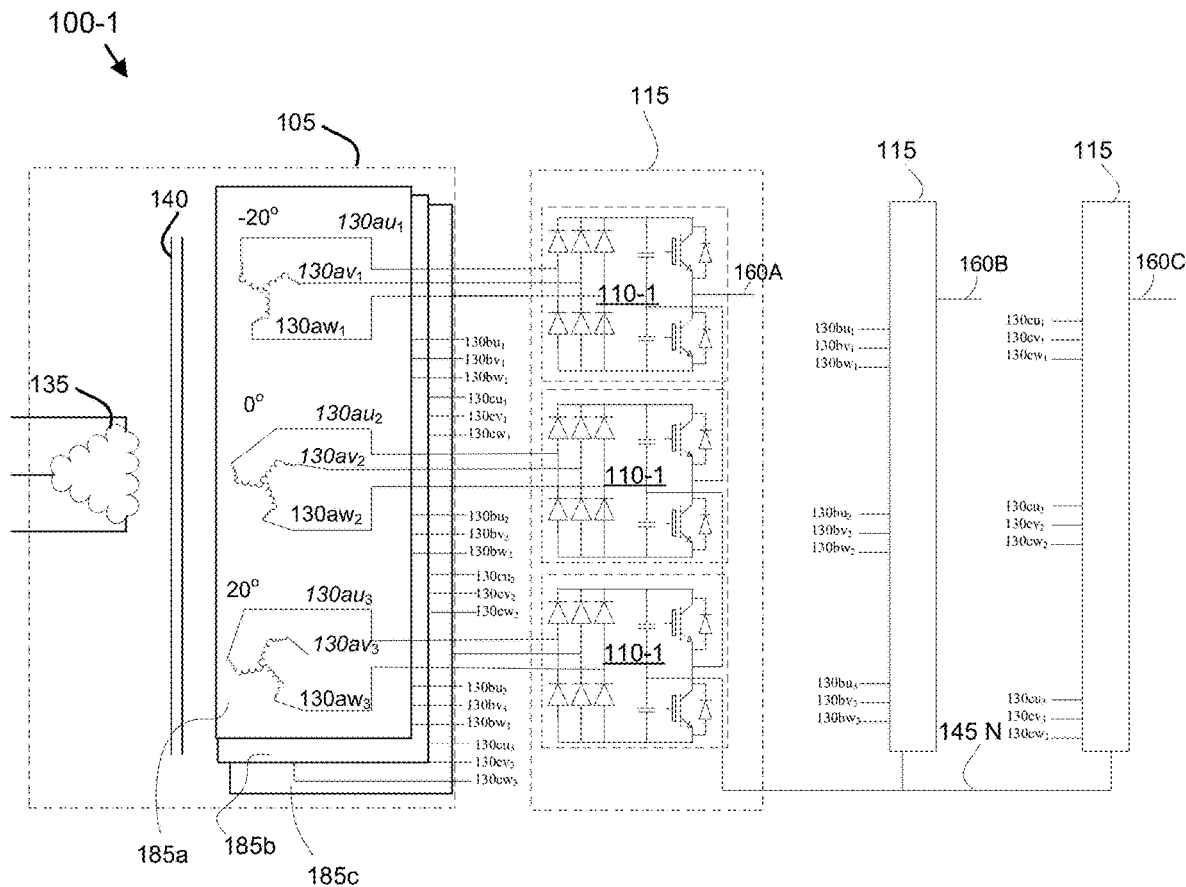
FIG. 2B is a schematic diagram of a power supply with power cells with a six-device rectifier and a two-device inverter according to an embodiment.

FIG. 2B is a schematic diagram of a power supply 100*a* of FIG. 1A with power cells 110-1 of FIG. 2A with a six-power semiconductor device rectifier 150 and a two-power semiconductor device inverter 155. In the depicted embodiment, each phase of the three-phases of the secondary winding sets 130 comprises three multiphase sections 185. The rectifier 150 of each power cell 110-1 comprises six diodes 125*a*. The inverter 155 of each power cell 110-1 comprises two IGBTs 125*b*. For clarity, one power cell set 115 is fully displayed and the two other power cell sets 115 are schematically displayed.

Figure 3A:
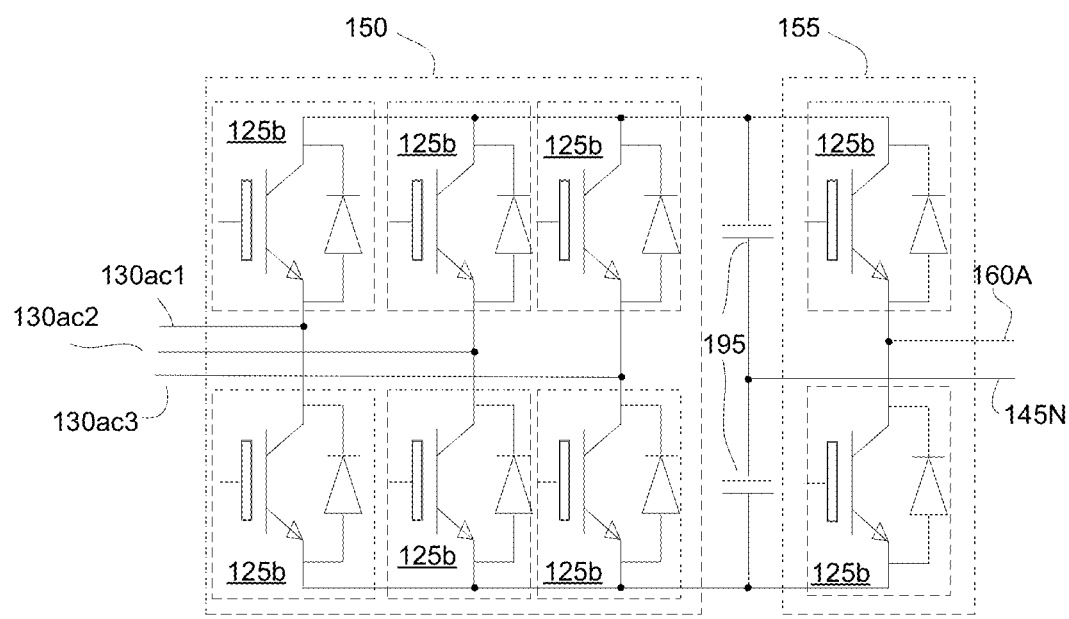
FIG. 3A is a schematic diagram of a power cell with a six-device rectifier and a two-device inverter according to an alternate embodiment.

FIG. 3A is a schematic diagram of a power cell 110-2 with a six-power semiconductor device rectifier 150 and a two-power semiconductor device inverter 155. In the depicted embodiment, the power cell 110-2 comprises a rectifier 150 and an inverter 155. The rectifier 150 comprises six IGBTs 125*b*. The rectifier 150 is connected to one secondary winding set 130*ac*1-3. The inverter 155 comprises two IGBTs 125*b* that output a phase 160A-C of the three-phase AC output and a neutral 145N. Two non-power semiconductor device capacitors 195 are also shown.

Figure 3B:
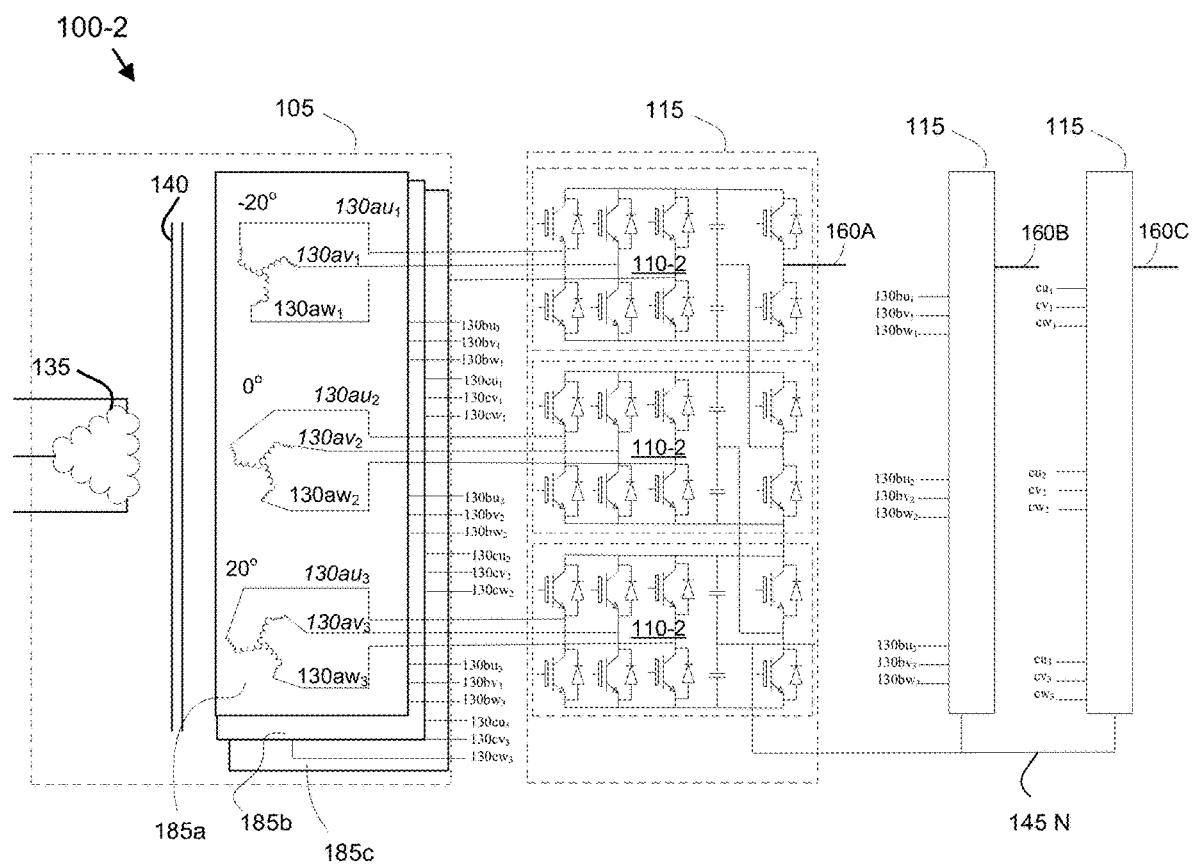
FIG. 3B is a schematic diagram of a power supply with power cells with a six-device rectifier and a two-device inverter according to an alternate embodiment.

FIG. 3B is a schematic diagram of a power supply 100*a* of FIG. 1A with power cells 110-2 of FIG. 3A with a six-semiconductor power device rectifier 150 and a two-semiconductor power device inverter 155. Each phase of the three-phases of the secondary winding sets 130 comprises three multiphase sections 185. The rectifier 150 of each power cell 110-2 comprises six IGBTs 125*b*. The inverter 155 of each power cell 110-2 comprises two IGBTs 125*b*. For clarity, one power cell set 115 is fully displayed and the two other power cell sets 115 are schematically displayed.

Figure 4A:
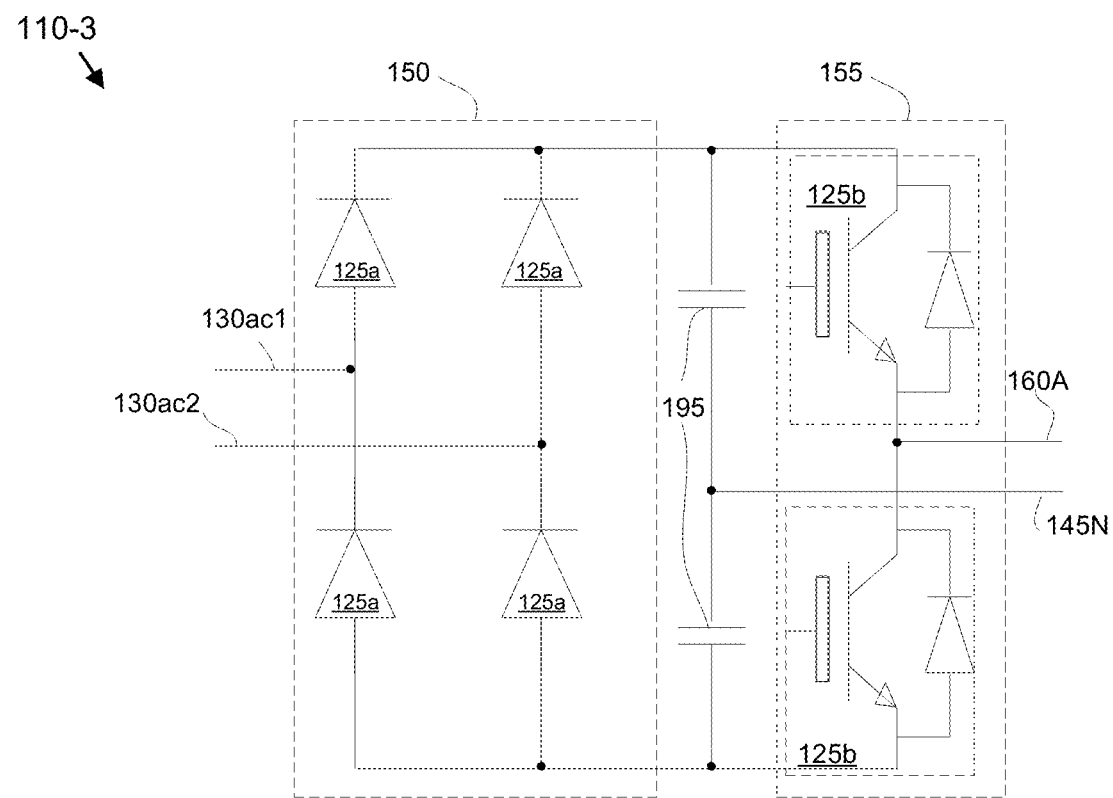
FIG. 4A is a schematic diagram of a power cell with a four-device rectifier and a two-device inverter according to an embodiment.

FIG. 4A is a schematic diagram of a power cell 110-3 with a four-semiconductor power device rectifier 150 and a two-semiconductor power device inverter 155. In the depicted embodiment, the power cell 110-3 comprises a rectifier 150 and an inverter 155. The rectifier 150 comprises four diodes 125*a*. The rectifier 150 is connected to one secondary winding set 130*ac*1-2. The inverter 155 comprises two IGBTs 125*b* that output a phase 160A-C of the three-phase AC output and a neutral 145N. Two non-power semiconductor device capacitors 195 are also shown.

Figure 4B:
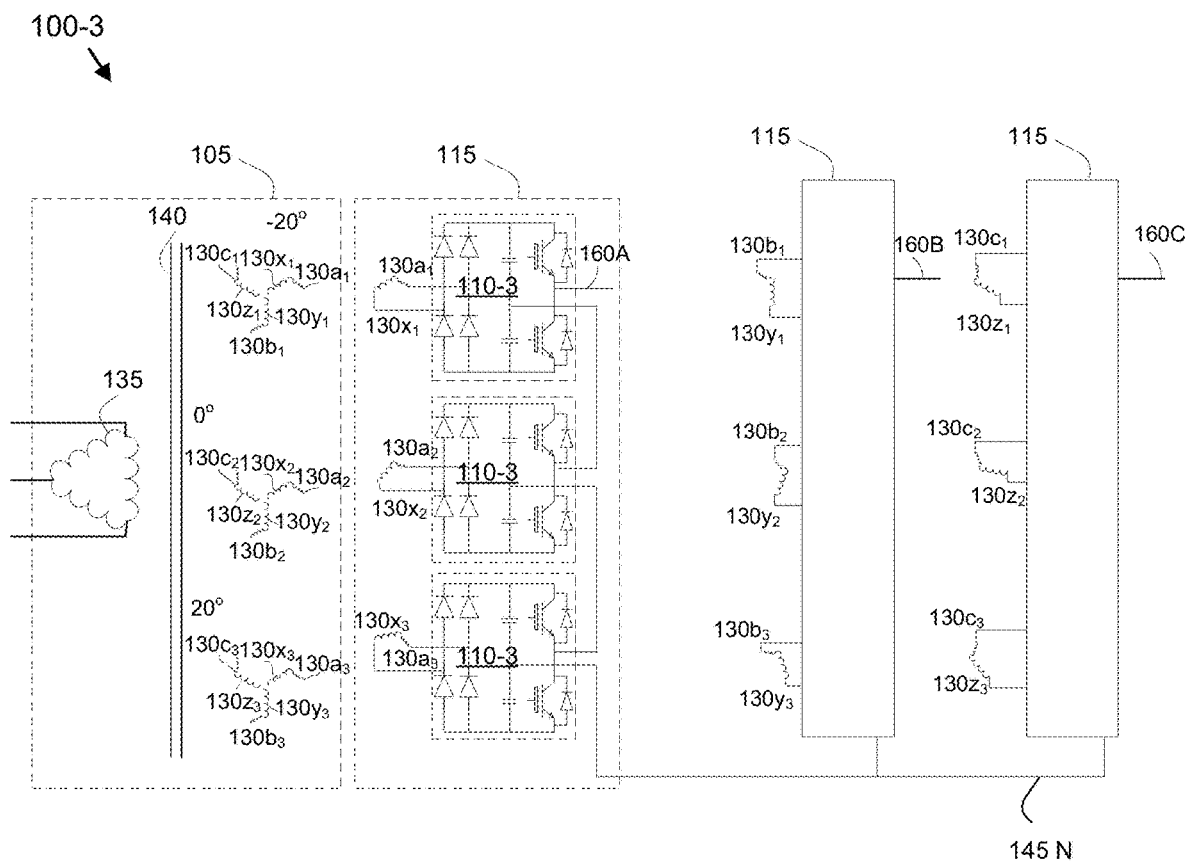
FIG. 4B is a schematic diagram of a power supply with power cells with a four-device rectifier and a two-device inverter according to an embodiment.

FIG. 4B is a schematic diagram of a power supply 110*b* of FIG. 1B with power cells 110-3 of FIG. 4A with a four-semiconductor power device rectifier 150 and a two-semiconductor power device inverter 155. The phase shifting transformer 105 comprises 3 secondary winding sets 130 with 20 degree phase shifts among the voltage provided each secondary winding set 130. The rectifier 150 of each power cell 110-3 comprises four diodes 125*a*. The inverter 155 of each power cell 110-3 comprises two IGBTs 125*b*. For clarity, one power cell set 115 is fully displayed and the two other power cell sets 115 are schematically displayed.

Figure 5A:
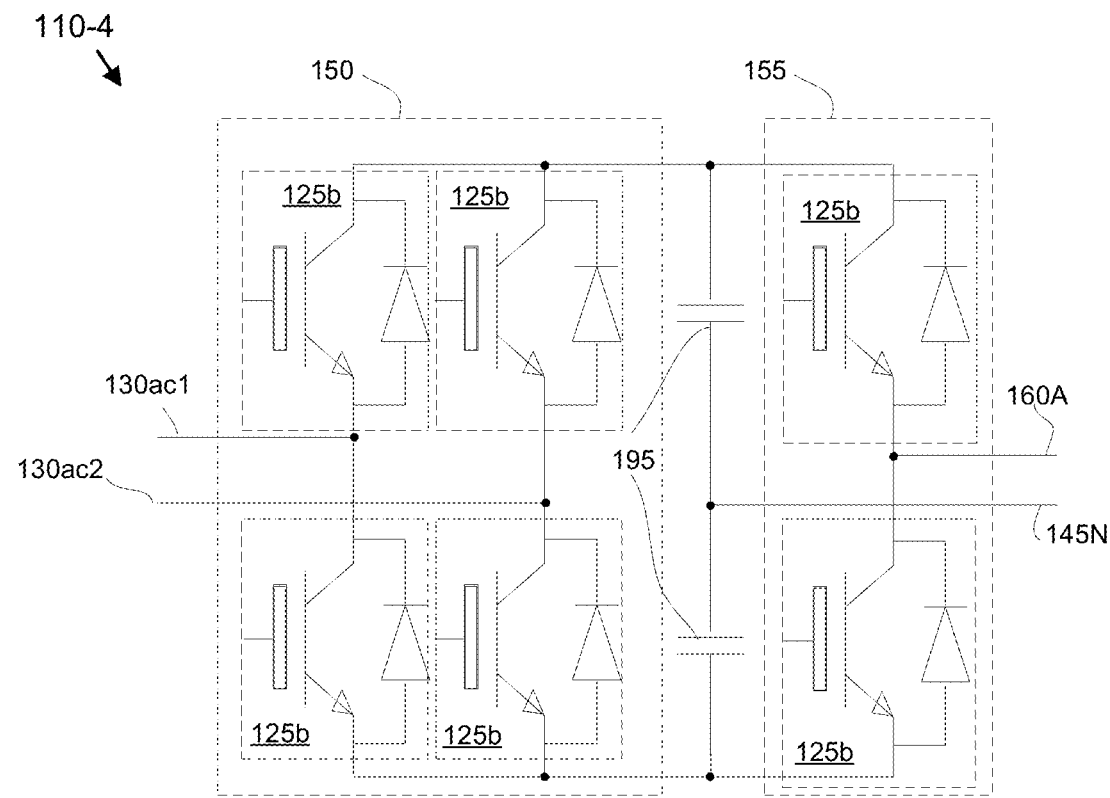
FIG. 5A is a schematic diagram of a power cell with a four-device rectifier and a two-device inverter according to an alternate embodiment.

FIG. 5A is a schematic diagram of a power cell 110-4 with a four-semiconductor power device rectifier 150 and a two-semiconductor power device inverter 155. In the depicted embodiment, the power cell 110-4 comprises a rectifier 150 and an inverter 155. The rectifier 150 comprises four IGBTs 125*b*. The rectifier 150 is connected to one secondary winding set 130*ac*1-2. The inverter 155 comprises two IGBTs 125*b* that output a phase 160A-C of the three-phase AC output and a neutral 145N. Two non-power semiconductor device capacitors 195 are also shown.

Figure 5B:
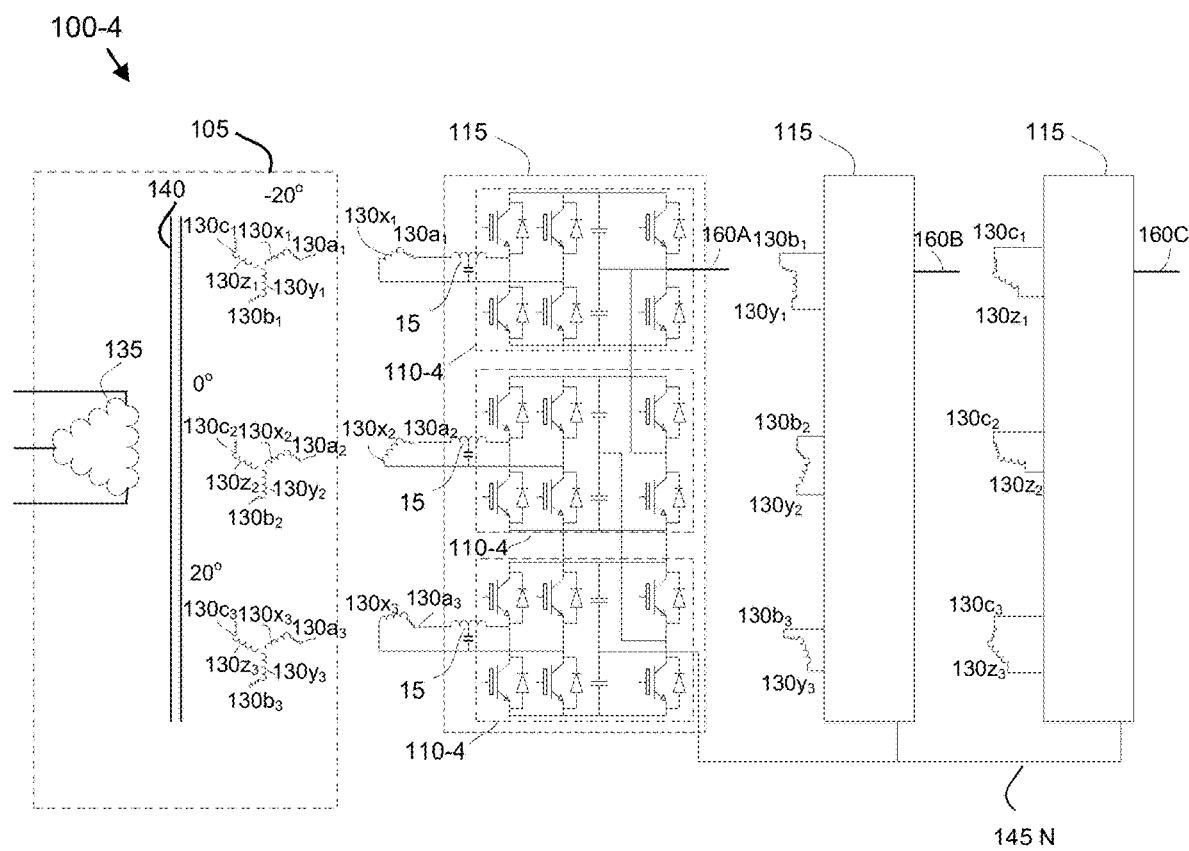
FIG. 5B is a schematic diagram of a power supply with power cells with a four-device rectifier and a two-device inverter according to an alternate embodiment.

FIG. 5B is a schematic diagram of a power supply 100*b* of FIG. 1B with power cells 110-4 of FIG. 5A with a four-semiconductor power device rectifier 150 and a two-semiconductor power device inverter 155. In the depicted embodiment, the rectifier 150 of each power cell 110-4 comprises four IGBTs. The inverter 155 of each power cell 110-4 comprises two IGBTs 125*b*. In addition, each power cell 110-4 comprises an LCL filter 15 that filters the current from the secondary winding set 130. For clarity, one power cell set 115 is fully displayed and the two other power cell sets 115 are schematically displayed.

Figure 6A:
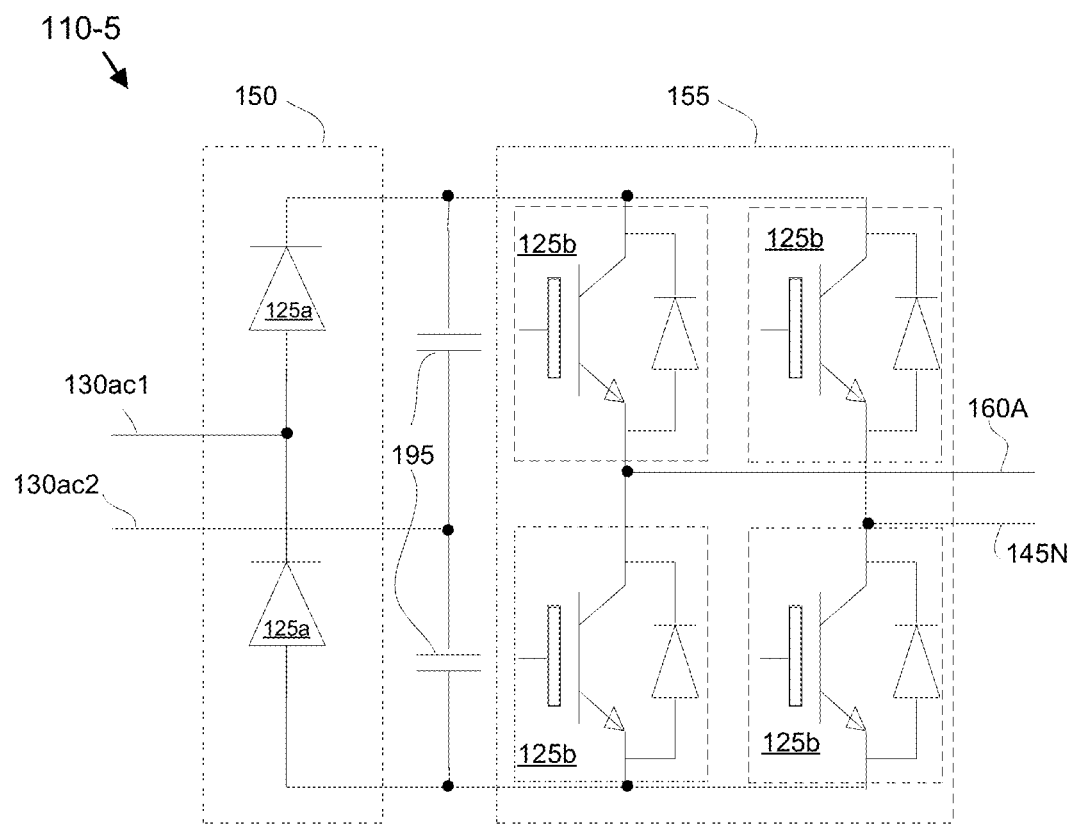
FIG. 6A is a schematic diagram of a power cell with a two-device rectifier and a four-device inverter according to an embodiment.

FIG. 6A is a schematic diagram of a power cell 110-5 with a two-semiconductor power device rectifier 150 and a four-semiconductor power device inverter 155. In the depicted embodiment, the power cell 110 comprises a rectifier 150 and an inverter 155. The rectifier 150 comprises two diodes 125*a*. The rectifier 150 is connected to one secondary winding set 130*ac*1-2. The inverter 155 comprises four IGBTs 125*b* that output a phase 160A-C of the three-phase AC output and a neutral 145N. Two non-power semiconductor device capacitors 195 are also shown.

Figure 6B:
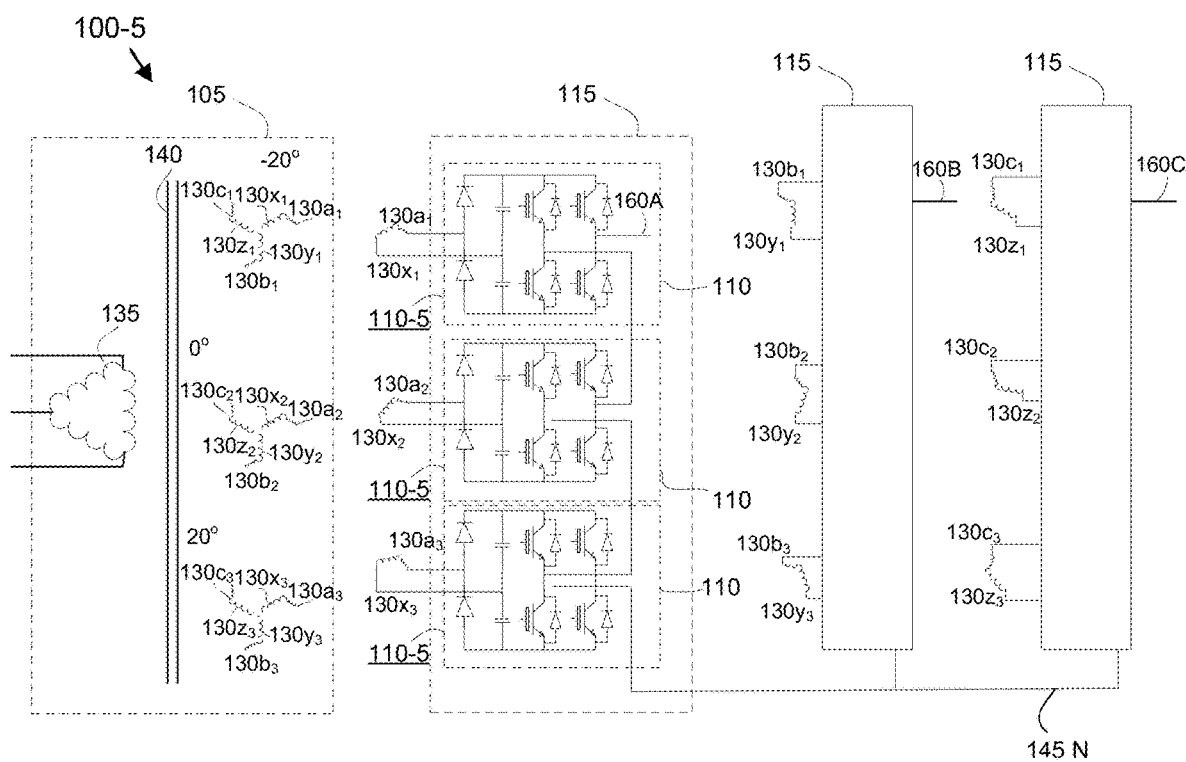
FIG. 6B is a schematic diagram of a power supply with power cells with a two-device rectifier and a four-device inverter according to an embodiment.

FIG. 6B is a schematic diagram of a power supply 100*b* of FIG. 1B with power cells 110-5 with a two-semiconductor power device rectifier 150 and a four-semiconductor power device inverter 155. The rectifier 150 of each power cell 110-5 comprises two diodes 125*a*. The inverter 155 of each power cell 110-5 comprises four IGBTs 125*b*. For clarity, one power cell set 115 is fully displayed and the two other power cell sets 115 are schematically displayed.

Figure 7A:
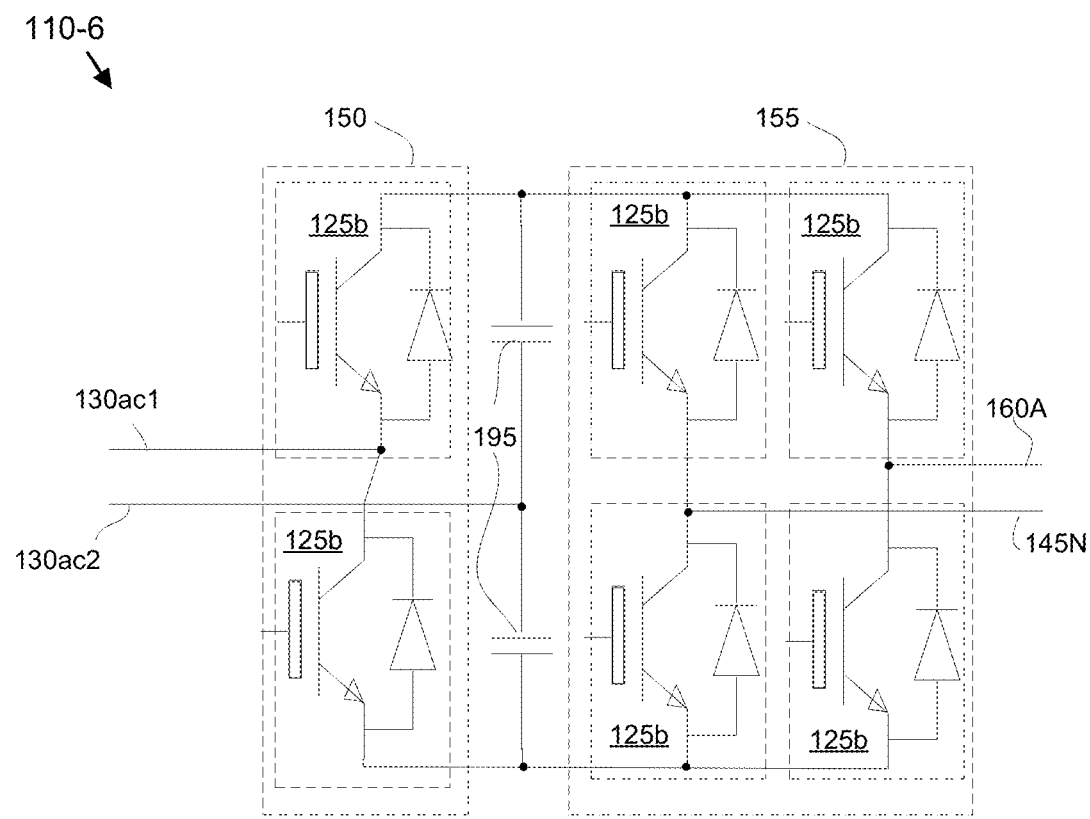
FIG. 7A is a schematic diagram of a power cell with a two-device rectifier and a four-device inverter according to an alternate embodiment.

FIG. 7A is a schematic diagram of a power cell 110-6 with a two-semiconductor power device rectifier 150 and a four-semiconductor power device inverter 155. In the depicted embodiment, the power cell 110-6 comprises a rectifier 150 and an inverter 155. The rectifier 150 comprises two IGBTs 125*b*. The rectifier 150 is connected to one secondary winding set 130*ac*1-2. The inverter 155 comprises four IGBTs 125*b* that output a phase 160A-C of the three-phase AC output and a neutral 145N. Two non-power semiconductor device capacitors 195 are also shown.

Figure 7B:
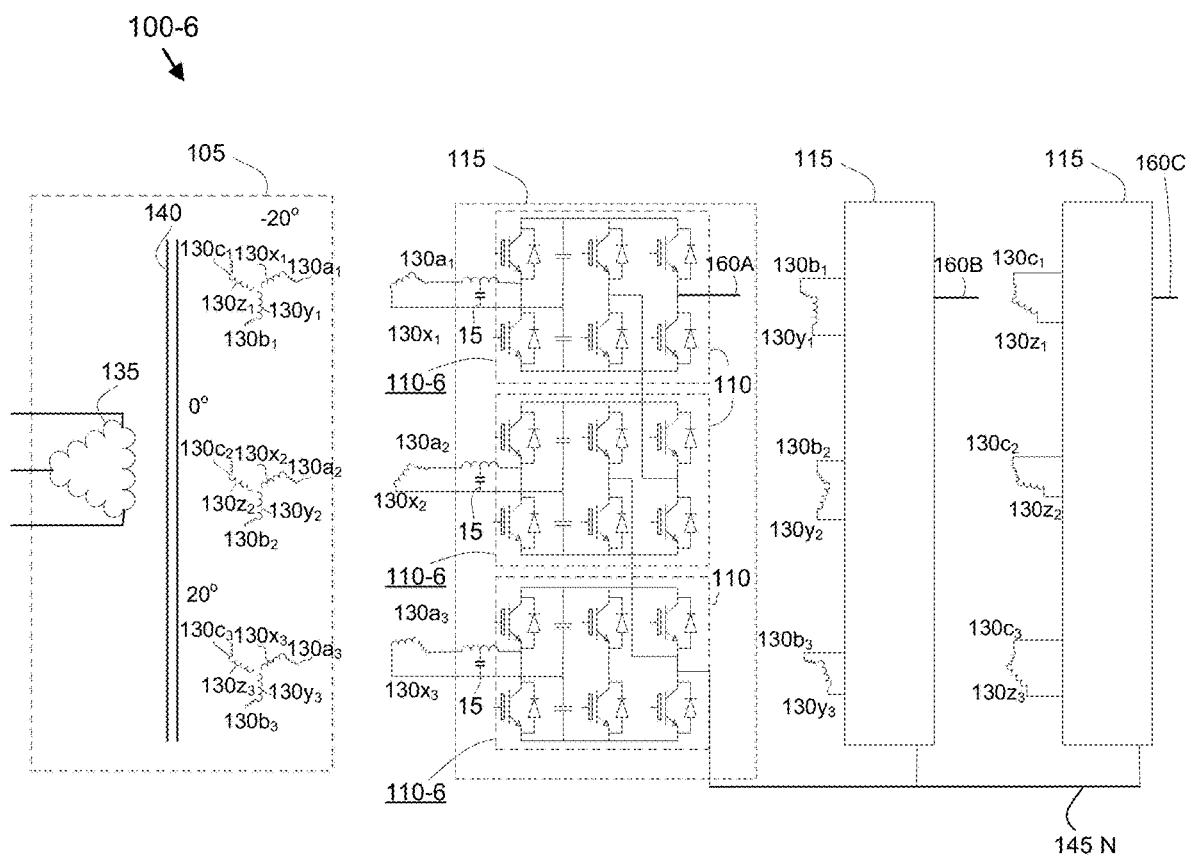
FIG. 7B is a schematic diagram of a power supply with power cells with a two-device rectifier and a four-device inverter according to an alternate embodiment.

FIG. 7B is a schematic diagram of a power supply 100*b* of FIG. 1B with power cells 110-6 of FIG. 7A with a two-semiconductor power device rectifier 150 and a four-semiconductor power device inverter 155. In the depicted embodiment, the rectifier 150 of each power cell 110-6 comprises two IGBTs 125b. The inverter 155 of each power cell 110-6 comprises four IGBTs 125b. In addition, each power cell 110-6 comprises an LCL filter 15. For clarity, one power cell set 115 is fully displayed and the two other power cell sets 115 are schematically displayed.

Figure 8A:
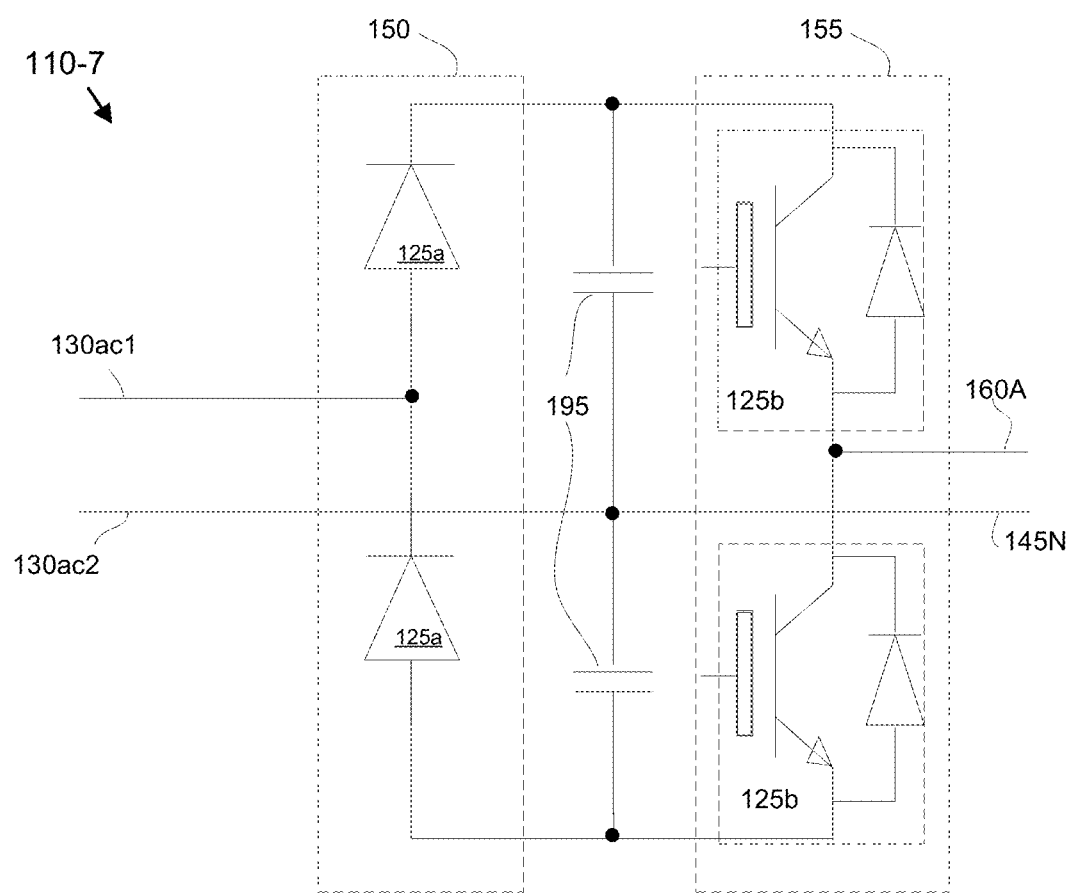
FIG. 8A is a schematic diagram of a power cell with a two-device rectifier and a two-device inverter according to an embodiment.

FIG. 8A is a schematic diagram of a power cell 110-7 with a two-semiconductor power device rectifier 150 and a two-semiconductor power device inverter 155. In the depicted embodiment, the power cell 110-7 comprises a rectifier 150 and an inverter 155. The rectifier 150 comprises two diodes 125a. The rectifier 150 is connected to one secondary winding set 130ac1-2. The inverter 155 comprises two IGBTs 125b that output a phase 160A-C of the three-phase AC output and a neutral 145N. Two non-power semiconductor device capacitors 195 are also shown.

Figure 8B:
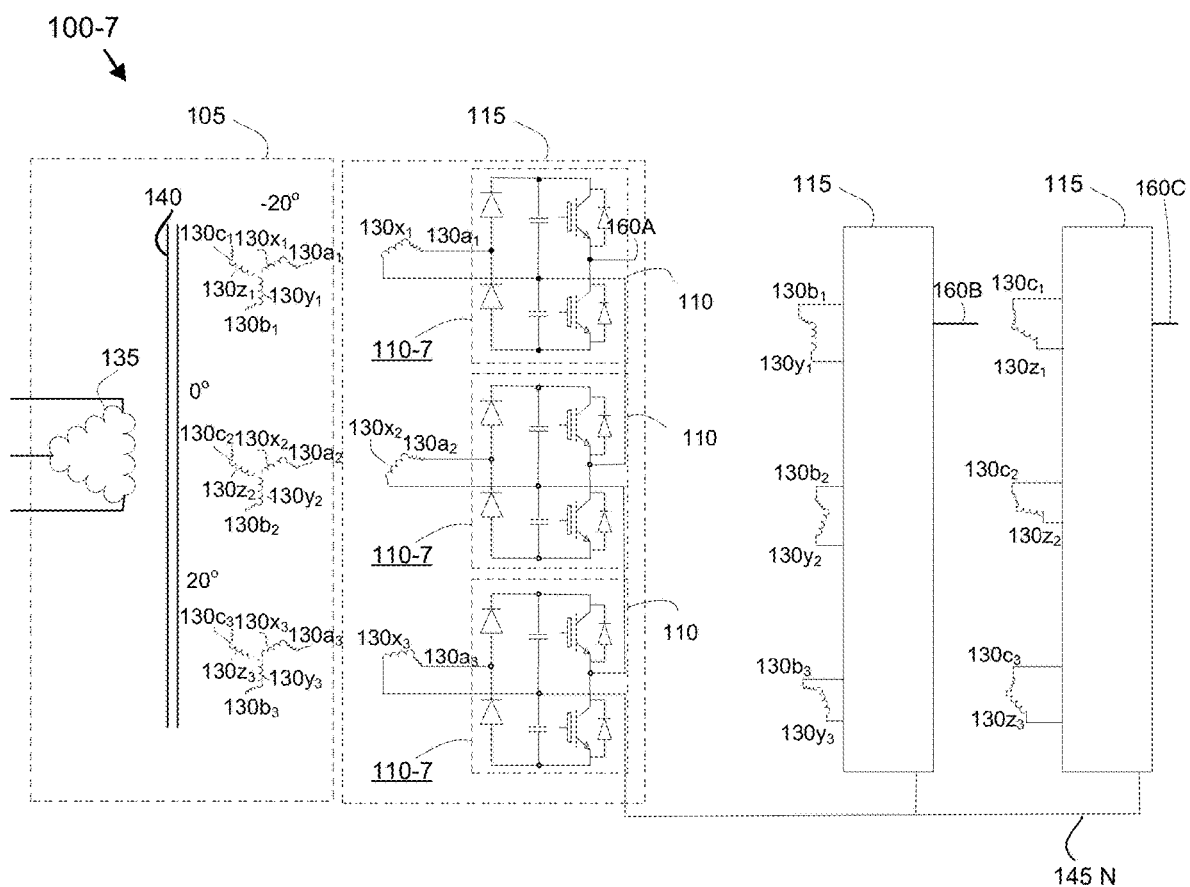
FIG. 8B is a schematic diagram of a power supply with power cells with a two-device rectifier and a two-device inverter according to an embodiment.

FIG. 8B is a schematic diagram of a power supply 100b of FIG. 1B with power cells 110-7 of FIG. 8A with a two-semiconductor power device rectifier 150 and a two-semiconductor power device inverter 155. In the depicted embodiment, the rectifier 150 of each power cell 110-7 comprises two diodes 125a. The inverter 155 of each power cell 110-7 comprises two IGBTs 125b. For clarity, one power cell set 115 is fully displayed and the two other power cell sets 115 are schematically displayed.

Figure 9A:
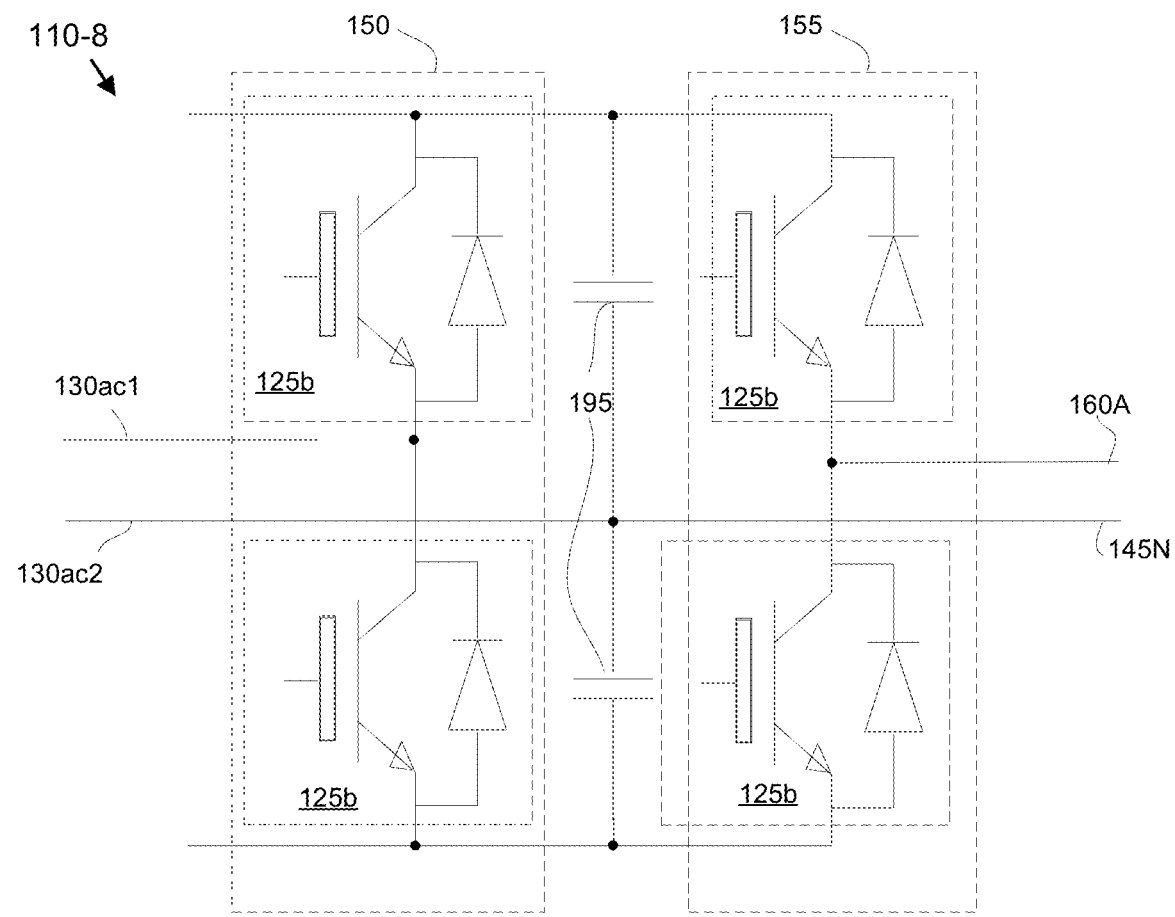
FIG. 9A is a schematic diagram of a power cell with a two-device rectifier and a two-device inverter according to an alternate embodiment.

FIG. 9A is a schematic diagram of a power cell 110-8 with a two-semiconductor power device rectifier 150 and a two-semiconductor power device inverter 155. In the depicted embodiment, the power cell 110-8 comprises a rectifier 150 and an inverter 155. The rectifier 150 comprises two IGBTs 125b. The rectifier 150 is connected to one secondary winding set 130ac1-2. The inverter 155 comprises two IGBTs 125b that output a phase 160A-C of the three-phase AC output and a neutral 145N. Two non-power semiconductor device capacitors 195 are also shown.

Figure 9B:
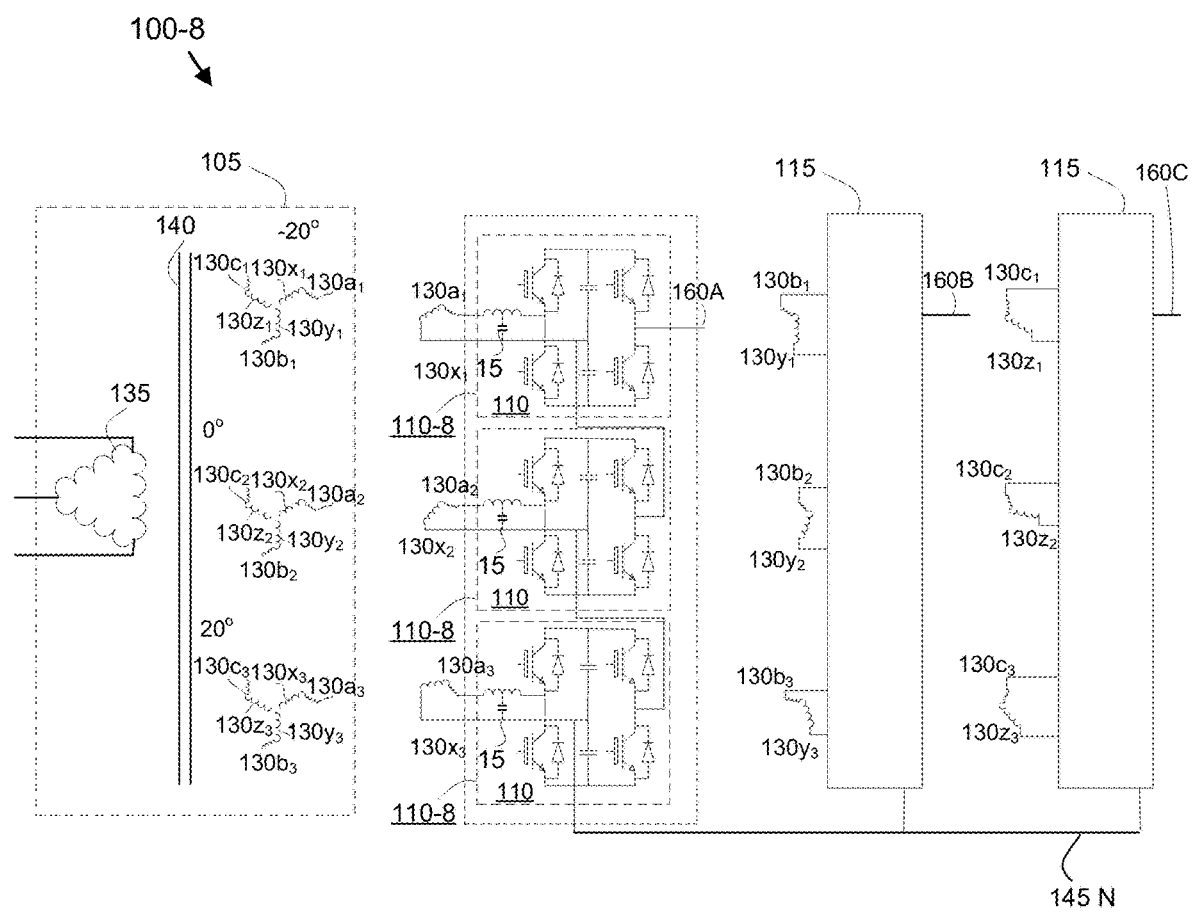
FIG. 9B is a schematic diagram of a power supply with power cells with a two-device rectifier and a two-device inverter according to an alternate embodiment.

FIG. 9B is a schematic diagram of a power supply 100b of FIG. 1B with power cells 110-8 of FIG. 9A with a two-semiconductor power device rectifier 150 and a two-semiconductor power device inverter 155. In the depicted embodiment, the rectifier 150 of each power cell 110-8 comprises two IGBTs 125b, and the inverter 155 of each power cell 110 comprises two IGBTs 125b. In addition, each power cell 110-8 comprises an LCL filter 15. For clarity, one power cell set 115 is fully displayed and the two other power cell sets 115 are schematically displayed.

Figure 10:
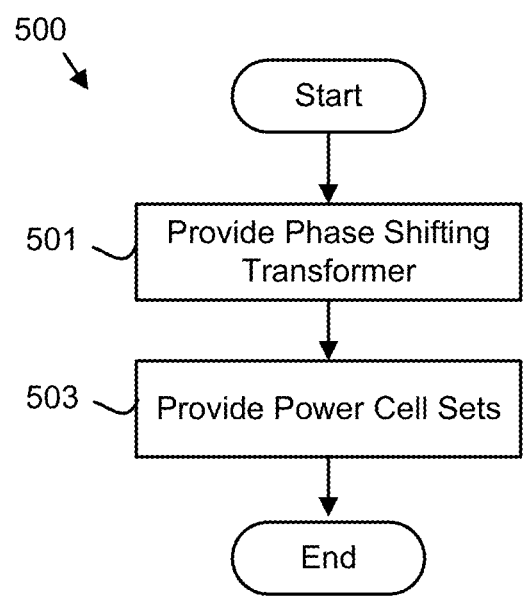
FIG. 10 is a flow chart diagram of a power supply method according to an embodiment.

FIG. 10 is a flow chart diagram of a power supply method 500. The method 500 may be performed by the power supply 100. The method 500 may provide 501 a phase shifting transformer 105 that receives the three-phase primary voltage and steps the three-phase primary voltage down to the secondary voltage with a plurality of secondary winding sets 130a-c. In one embodiment, there is phase shifting between different secondary winding sets 130.

The method may further provide 503 a plurality of power cell sets 115 that each comprise a plurality of power cells 110 cascaded connected. Each power cell 110 may receive one of a single phase and a three-phase voltage of a distinct secondary winding set 130 of the phase shifting transformer 105. Each power cell 110 may comprise no more than eight power semiconductor devices 125 organized as a rectifier 150 and an inverter 155. Each power semiconductor device 125 may be one of a diode 125a and an IGBT 125b. Each IGBT may comprise an anti-parallel diode 143. Each power cell set 115 may generate one phase of a three-phase AC output.

Figure 11:
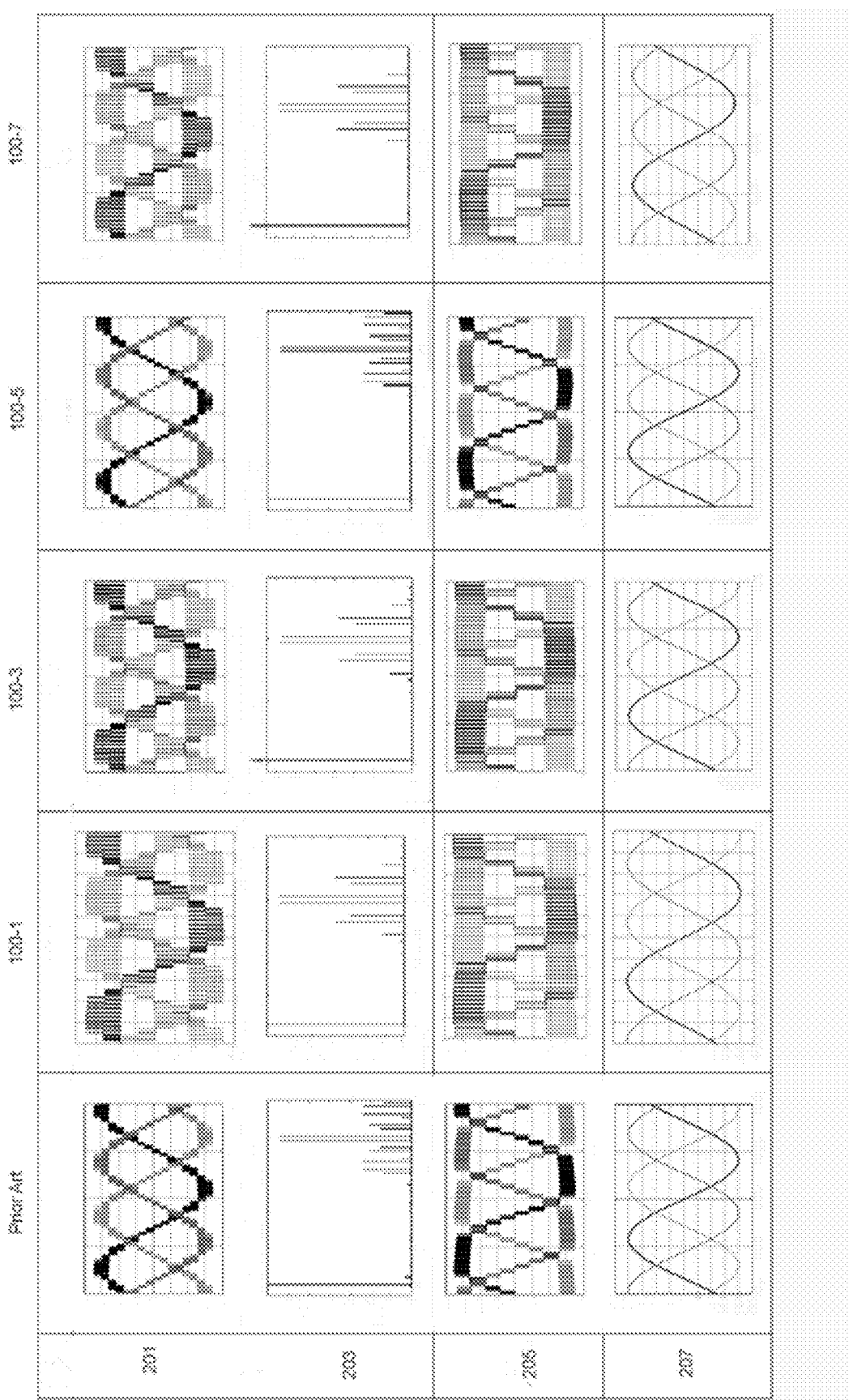
FIG. 11 is graphs of power supply outputs according to an embodiment.

FIG. 11 is graphs of power supply outputs that compares the line-to-line output voltage 201, the line-to-line harmonics 203, the line-to-neutral output voltage 205, and the line-to-neutral current 207 for the output of a prior art power cell, the power cell 110-1 of FIG. 2A, the power cell 110-3 of FIG. 4A, the power cell 110-5 of FIG. 6A, and the power cell 110-7 of FIG. 8A.

Problem/Solution

The cost of a power supply 100 is significantly impacted by the number of power semiconductor devices 125 in each power cell 110. Reducing the power semiconductor devices 125 significantly reduces the cost of the power supply 100. The embodiments employ power cells 110 with no more than eight power semiconductor devices 125 and as few as four power semiconductor devices 125. As a result, the embodiments enable power supplies 100 with significantly reduced cost.

This description uses examples to disclose the invention and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A power supply comprising: a phase shifting transformer that receives a three-phase primary voltage and steps the three-phase primary voltage one of up and down to a secondary voltage with a plurality of secondary winding sets, wherein the phase shifting transformer comprises n secondary windings sets, each secondary winding set comprising 3 isolated single phase; and three power cell sets that each comprise a plurality of n power cells cascaded connected, and each power cell receives a single phase voltage of a distinct secondary winding set of the phase shifting transformer, wherein each power cell comprises no more than 6 power semiconductor devices organized as a rectifier and an inverter, the rectifier of each power cell comprises two power semiconductor devices, a first input terminal of the rectifier connects to an interconnection point of the two power semiconductor devices, a second input terminal of the rectifier connects to a middle point of a direct current common to the rectifier and the inverter, the inverter of each power comprises no more than four power semiconductor devices, the power cell in each power cell set are connected in series at outputs with first ends of the three sets of power cells connected together to form a neutral point and second ends of the three sets of power cells connected to output terminals of the power supply, and each power cell set generates one phase of a three-phase Alternating Current (AC) output.

2. The power supply 100 of claim 1, wherein the phase shifting transformer comprises 9 secondary winding sets with 20 degree phase shifts among a voltage provided by a top three secondary winding sets, a middle three secondary winding sets, and a bottom three secondary winding sets.

3. The power supply of claim 2, wherein each phase of three-phases of the secondary winding sets comprises three multiphase sections, the rectifier of each power cell comprises two diodes, and the inverter of each power cell comprises four Insulated Gate Bipolar Transistors (IGBTs) active switches.

4. The power supply of claim 2, wherein each phase of the three-phases of the secondary winding sets comprises three multiphase sections, the rectifier of each power cell comprises two IGBTs, and the inverter of each power cell comprises IGBTs.

5. The power supply of claim 1, wherein the phase shifting transformer comprises 3 secondary winding sets with 20 degree phase shifts among a voltage provided each secondary winding set.

6. The power supply of claim 5, wherein the rectifier of each power cell comprises two power semiconductor device, and the inverter of each power cell comprises two power semiconductor.

7. The power supply of claim 5, wherein the rectifier of each power cell comprises two power semiconductor device, and the inverter of each power cell comprises two power semiconductor.

8. The power supply of claim 5, wherein the rectifier of each power cell comprises two diodes, and the inverter of each power cell comprises four IGBTs.

9. The power supply of claim 5, wherein the rectifier of each power cell comprises two IGBTs, and the inverter of each power cell comprises four IGBTs.

10. The power supply of claim 5, wherein the rectifier of each power cell comprises two diodes, and the inverter of each power cell comprises two IGBTs.

11. The power supply of claim 5, wherein the rectifier of each power cell comprises two IGBTs, and the inverter of each power cell comprises two IGBTs.

12. An apparatus comprising: three power cell sets that each comprise a plurality of n power cells cascaded connected, and each power cell receives a single phase voltage of a distinct secondary winding set of a phase shifting transformer comprising n secondary winding sets, each secondary winding set comprising 3 isolated single-phases, wherein each power cell comprises no more than six power semiconductor devices organized as a rectifier and an inverter, the rectifier of each power cell comprises two power semiconductor devices, a first input terminal of the rectifier connects to a interconnection point of the two power semiconductor devices, a second input terminal of the rectifier connects to a middle point of a direct current link common to the rectifier and the inverter, the inverter of each power cell comprises no more than four power semiconductor devices, the power cells in each power cell set are connected in series at outputs with first ends of the three sets of power cells connected together to form a neutral point and second ends of the three sets of power cells connected to output terminals of a power supply; and each power cell set generates one phase of a three-phase Alternating Current (AC) output.

13. The apparatus of claim 12, wherein the phase shifting transformer comprises 9 secondary winding sets with 20 degree phase shifts among a voltage provided by a top three secondary winding sets, a middle three secondary winding sets, and a bottom three secondary winding sets.

14. The apparatus of claim 13, wherein each phase of three-phases of the secondary winding sets comprises three multiphase sections, the rectifier of each power cell comprises two diodes, and the inverter of each power cell comprises four Insulated Gate Bipolar Transistor (IGBTs) active switches.

15. The apparatus of claim 13, wherein each phase of three-phases of the secondary winding sets comprises three multiphase sections, the rectifier of each power cell comprises two IGBTs, and the inverter of each power cell comprises four IGBTs.

16. The apparatus of claim 12, wherein the phase shifting transformer comprises 3 secondary winding sets with 20 degree phase shifts among a voltage provided each secondary winding set.

17. The apparatus of claim 16, wherein the rectifier of each power cell comprises two power semiconductor devices, and the inverter of each power cell comprises two power semiconductor devices.

18. The apparatus of claim 16, wherein the rectifier of each power cell comprises two IGBTs, and the inverter of each power cell comprises two IGBTs.

19. A method comprising: providing a phase shifting transformer that receives a three-phase primary voltage and steps the three-phase primary voltage one or up and down to a secondary voltage with a plurality of secondary winding sets, wherein the phase shifting transformer comprises n secondary winding sets, each secondary winding set comprising 3 isolated single-phase; and providing three power cell sets that each comprise a plurality of n power cells cascaded connected, and each power cell receives a single phase voltage of a distinct secondary winding set of the phase shifting transformer, wherein each power cell comprises no more than six power semiconductor devices organized as a rectifier and an inverter, the rectifier of each power cell comprises two power semiconductor devices, a first input terminal of the rectifier connects to an interconnection point of the two power semiconductor devices, a second input terminal of the rectifier connects to a middle point of a direct current link common to the rectifier and the inverter, the inverter of each power cell comprises four power semiconductor devices the power cells in each power cell set are connected in series at outputs with first ends of three sets of power cells connected together to form a neutral point and second ends of the three sets of power cells connected to output terminals of a power supply; and each power cell set generates one phase of a three-phase Alternating Current (AC) output.

20. The method of claim 19, wherein the phase shifting transformer comprises 3 secondary winding sets with 20 degree phase shifts among a voltage provided each secondary winding set, the rectifier of each power cell comprises two diodes, and the inverter of each power cell comprises four Insulated Gate Bipolar Transistor (IGBTs).

* * * * *